United States Patent [19]

Meade et al.

[11] Patent Number: 5,338,154
[45] Date of Patent: Aug. 16, 1994

[54] TURBINE DISK INTERSTAGE SEAL AXIAL RETAINING RING

[75] Inventors: Robert J. Meade, West Chester; Richard W. Albrecht, Fairfield; Robert H. Weisgerber, Loveland, all of Ohio

[73] Assignee: General Electric Company, Cincinnati, Ohio

[21] Appl. No.: 32,214

[22] Filed: Mar. 17, 1993

[51] Int. Cl.$^5$ .................. F01D 5/06; F01D 11/00
[52] U.S. Cl. .................. 415/173.7; 415/199.5; 415/174.5; 416/198 A; 416/220 R; 403/371
[58] Field of Search .............. 415/199.5, 173.7, 174.5; 416/198 A, 220 R; 403/351, 371

[56] References Cited

U.S. PATENT DOCUMENTS

| | | | |
|---|---|---|---|
| 3,023,998 | 3/1962 | Sanderson, Jr. | 415/173.7 |
| 4,470,756 | 9/1984 | Rigo et al. | 416/220 R |
| 4,566,857 | 1/1986 | Brumen | 416/220 R |
| 4,645,424 | 2/1987 | Peters | 415/173.7 |
| 4,669,959 | 6/1987 | Kalogeros | 415/199.5 |
| 4,869,640 | 9/1989 | Schwarz et al. | 415/173.7 |
| 5,211,407 | 5/1993 | Glynn et al. | 416/220 R |
| 5,236,302 | 8/1993 | Weisgerber et al. | 415/173.7 |

OTHER PUBLICATIONS

"Energy Efficient EngineHigh Pressure Turbine Test Hardware Detailed Design Report", prepared for National Aeronautics and Space Administration, by E. E. Halila et al., General Electric Company, pp. 64, 86, 87, 91, 101, 102, 106, 112, 116, 121, 149, 152 and 180.

Primary Examiner—Edward K. Look
Assistant Examiner—Michael S. Lee
Attorney, Agent, or Firm—Jerome C. Squillaro; Nathan D. Herkamp

[57] ABSTRACT

An axial retention system for an interstage seal located in a gas turbine engine of a type having a turbine section including a first stage disk and a second stage disk. The interstage seal includes a web portion having an aft arm extending from said web, the aft arm having a peripheral rim adjacent the second stage disk. The axial retention system comprising a split ring having two overlapping ends and a plurality of radially outwardly extending tabs for engaging a plurality of inwardly extending tabs located on the second stage disk adjacent the peripheral rim, in a bayonet connection. The retaining ring is located within a slot formed in the peripheral rim and the outwardly extending tabs are positioned in a passageway formed by the disk tabs.

4 Claims, 4 Drawing Sheets

TURBINE DISK INTERSTAGE SEAL AXIAL RETAINING RING

BACKGROUND OF THE INVENTION

The present invention relates to gas turbine engines and, more particularly, to aircraft-type high bypass ratio turbine engines having multi-stage compressor and turbine sections.

A typical modern gas turbine aircraft engine, particularly of the high bypass ratio type, includes multi-stage high pressure compressor and turbine sections interconnected by a central compressor shaft or, in some models, a forward shaft. In the latter instance, the forward shaft extends between the webs of the last stage high pressure compressor disk and the first stage high pressure turbine disk. The high pressure turbine section typically includes first and second stage disks in which the second stage disk is attached to the first stage disk by a bolted connection. The interstage volume between the first and second stage turbine disks is enclosed by a seal extending between the outer peripheries of the disks. The seal is generally cylindrical in shape and its wall is outwardly convex in shape.

The first and second stage disks are isolated by a forward face plate, attached to the forward face of the first stage disk, and an aft seal attached to the rearward face of the second stage disk web. Typically, cooling air ducted externally from the compressor section is circulated within the volumes adjacent to the face plate and aft seal, as well as the interstage volume, in order to cool the disks and blades they support. The cooling air is conveyed radially outwardly from the turbine section through channels formed in the turbine blades.

In such engines, virtually all of the connections between components are accomplished through bolting. That is, the forward face plate is connected to the stage one disk by a circular pattern of bolts, extending about the face plate and disk. The inner periphery of the face plate is bolted to a disk positioned forwardly of the first stage disk. Similarly, the interstage thermal seal is connected to the turbine disks through bolts in a circular pattern, typically clamping angular blade retaining rims to the opposite faces of the turbine disks as well. In addition, the second stage disk includes a rearwardly-extending cone which is bolted to the aft seal.

A disadvantage of such bolted connections is that they require holes to be formed in the disks which create stress concentrations and limit the useful lives of the seals and disks. Furthermore, additional disk weight is required to sustain the stresses imposed by the bolt and bolt hole engagements. Accordingly, recent turbine engines have been designed incorporating bayonet connections between the forward faceplate, interstage seal, aft seal and the first and second stage disks. The interstage seal for example includes a forward arm extending towards the first stage disk and an aft arm extending towards the second stage disk. The arms include a reverse catenary contour and include bayonet connection means for attachment with the first and second stage disks.

A disadvantage with such bayonet connections is that alignment of the first and second stage disks and seals is difficult to maintain during operation, which may result in excessive vibrations during operation.

Attempts have been made to prevent axial movement of the interstage seal with respect to the second stage disk by inserting a standard split retaining ring between a slot formed in the interstage seal aft arm and a corresponding slot formed in the second stage disk post. The split ring is an axisymmetric ring which is first inserted in the disk post slot at assembly and then is pushed down to engage the aft seal arm slot for axial retention. During operation of the engine the lower surface of a turbine blade restrains the radial motion of the split ring under centrifugal load. A disadvantage with the use of a split ring is that the slot in the disk post, which extends around the entire circumference of the engine, introduces a life-limiting characteristic to the assembly because of the large stress concentrations present in the slot area. Consequently the disk post is weakened and frequent replacement becomes necessary.

Accordingly, there is a need for mounting the first and second stage disks and interstage seal which minimizes alignment problems and further, there is a need for a design which eliminates axial movement of the interstage seal in connection with the first and second stage disks.

SUMMARY OF THE INVENTION

The present invention is an aircraft-type gas turbine engine in which the interstage seal, in the turbine section is connected to the first stage disk and the second stage disk by boltless connections, thereby eliminating the time-consuming task of properly torquing the bolts and eliminating the stress concentration problems associated with bolted connections. Further, the present invention provides axial retention of the interstage seal with respect to the second stage disk by providing an axisymmetric bayonet ring between the aft arm of the interstage seal and the second stage disk.

The current invention employs radial bayonet tabs located around the circumference of the ring to provide axial retention. The axisymmetric portion of the ring is contained in a slot formed in the aft arm bayonet connection while the outer tabs on the ring engage tabs located on the second stage disk post. This design allows the aft arm slot and the disk post contour to have a significantly lower stress thereby prolonging useful life. In addition, the bayonet tabs significantly lower the weight of the retaining ring because the ring is not required to move in and out radially during assembly and disassembly.

The interstage seal is attached to the stage one disk by a bayonet connection which prevents relative axial movement between these components and includes a peripheral rabbet which engages the stage one disk to prevent relative forward axial and outward radial movement of the forward arm of the interstage seal. Relative rotational movement of the interstage seal is prevented by fitting an anti-rotation key and wire axially into an opening between the stage one disk aft shaft and the interstage seal. Alternatively, an anti-rotation key can be located in the blade dovetail slot of the second stage disk which engages the interstage seal aft arm bayonet connection.

Accordingly, it is an object of the present invention to provide in an aircraft-type gas turbine engine in which bolted connections between the first and second stage disks, and the interstage seal are eliminated, a retaining ring to prevent axial movement between the interstage seal aft arm and the second stage disk; an axial retention ring including bayonet tabs for retention of mating hardware; and an axial retention ring which is lightweight and reduces stress concentrations at the bayonet connection thereby increasing useful life capability.

Other objects and advantages of the present invention will be apparent from the following description, the accompanying drawing and the appended claims.

DETAILED DESCRIPTION

Figure 1:
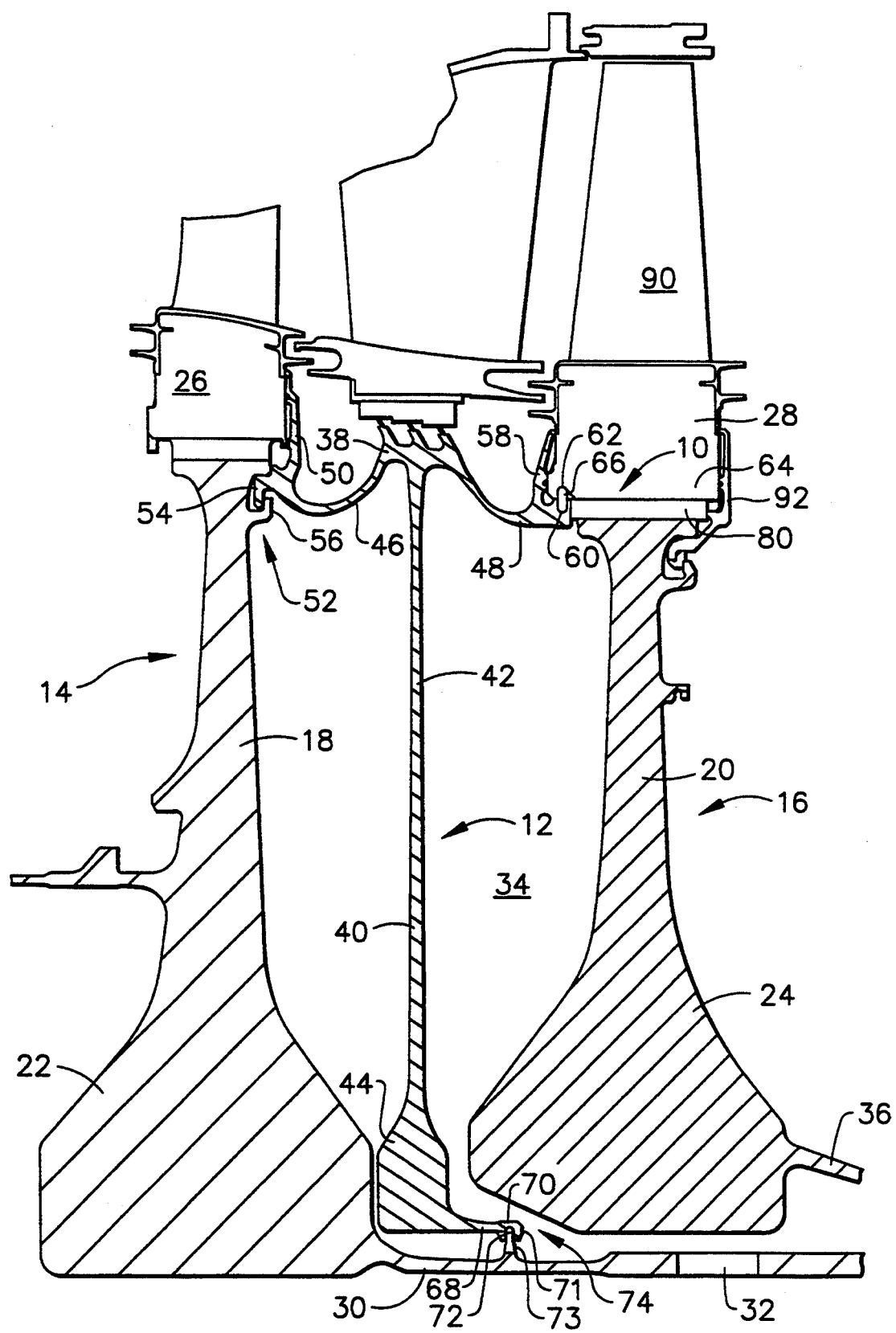
FIG. 1 is a partial side elevation in section of the turbine interstage seal of a gas turbine engine embodying the present invention.

As shown in FIG. 1, the present invention relates to an axial retention system generally designated 10, for an interstage seal 12 located in the turbine section of an aircraft-type high bypass ratio gas turbine engine. The turbine section includes first and second stage disks 14, 16, each having a web 18, 20 extending radially outward from a bore 22, 24, respectively. The webs 18, 20 each terminate in an outer periphery consisting of a plurality of blade dovetail slots 26, 28, respectively.

Bore 22 of first stage disk 14 includes a rearwardly-extending aft shaft 30 which includes a plurality of openings 32 which allow cooling air to enter the interstage volume 34. The second stage disk 16 includes a conical rear arm 36 which ultimately engages the aft shaft 30 at a splined connection.

The interstage seal 12 includes an outer shell 38 and a central disk 40 having a web 42 and a bore 44. The structure and bayonet connections of the interstage seal 12 are disclosed in more detail in commonly-owned U.S. patent application Ser. No. 07/785,404 filed Oct. 30, 1991, which is incorporated herein by reference. Shell 38 includes a forward arm 46 and an aft arm 48, connected to first and second stage disks, 14, 16 respectively. The shell 38 is generally cylindrical in shape, and the forward and aft arms 46, 48 each have an inwardly convex shape. More specifically, the forward and aft arms 46, 48 each have a catenary curve, which extends from the shell, to the respective disks 14, 16.

The forward arm 46 includes radially extending blade-retaining rim 50 and forms a bayonet connection 52 with disk 18. Bayonet connection 52 includes a plurality of radially inward-extending tabs 54 extending from forward arm 46 which mesh with radially outwardly-extending tabs 56 formed on web 18 of disk 14.

Disk 40 includes a bore 44 having a conical, rearwardly extending arm 68 terminating in an enlarged tail portion 70. Tail portion 70 is received in correspondingly-spaced tabs 72, formed on the aft shaft 30, in a bayonet connection 74. Tail portion 70 includes scallops which form openings to allow cooling air to flow between aft shaft 30 and conical arm 68. Bayonet connection 74 prevents the relative axial movement between bore 44 and aft shaft 30.

Figure 2:
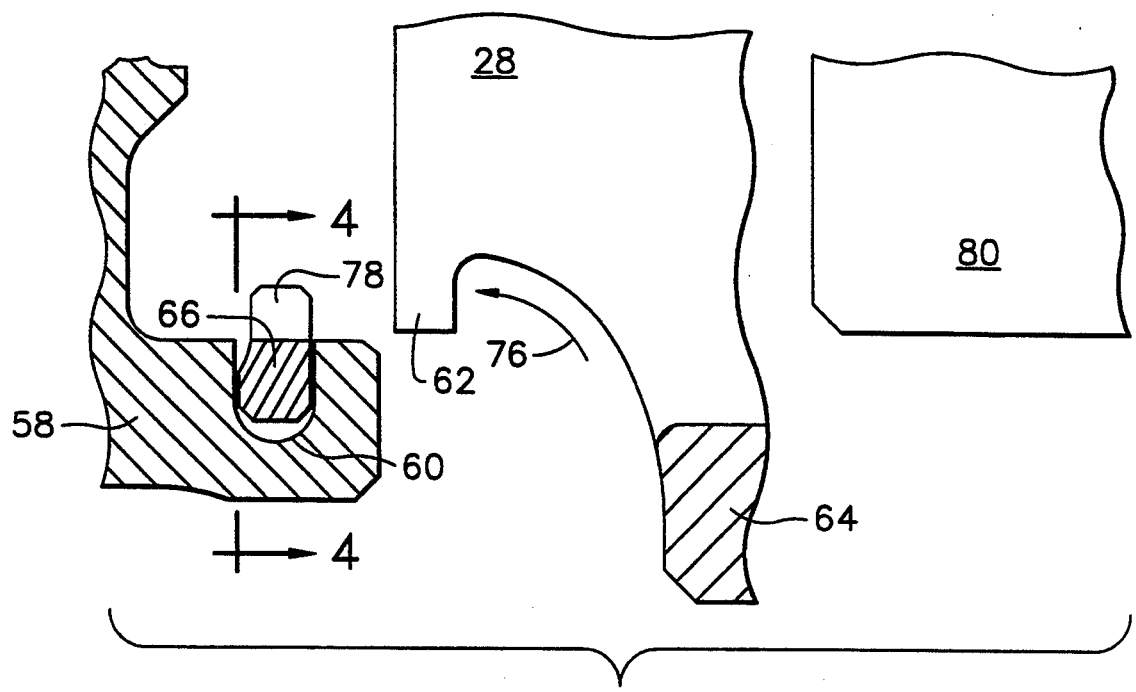
FIG. 2 is a detail of the seal of FIG. 1 showing the axial retaining ring prior to assembly of the seal.
Figure 3:
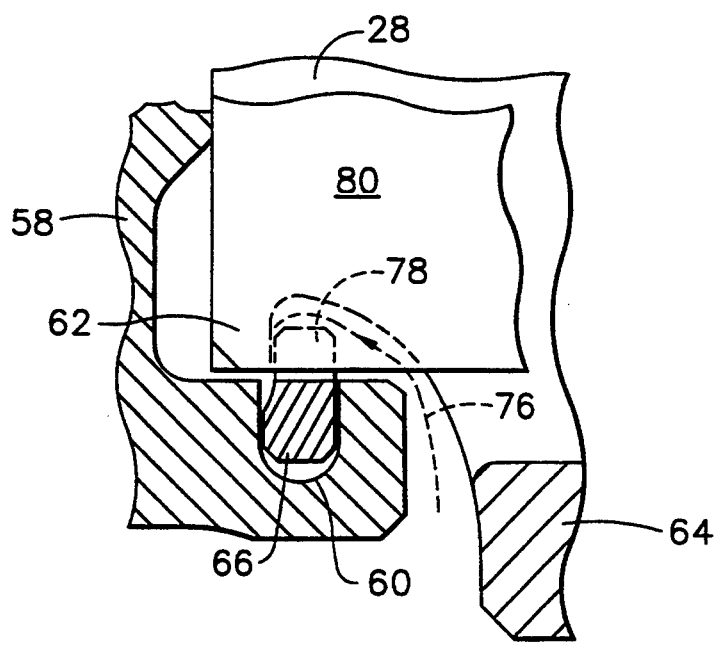
FIG. 3 is a detail of FIG. 1 showing the axial retaining ring in an assembled state.

Aft arm 48 includes an annular, peripheral rim 58 which engages blade dovetail slots 28 and acts as a blade retainer. A seal is affected between the rim and the dovetail slots. As also shown in FIGS. 2-3, aft arm 48 includes a peripheral groove 60 which aligns with a corresponding plurality of radially-inwardly extending tabs 62 formed on the disk post 64. The retaining ring 66 is positioned in a passageway 76 formed by groove 60 and tabs 62 and thereby prevents relative axial movement between aft arm 48 and disk 16.

The retaining ring 66 includes a plurality of radially extending tabs 78 uniformly spaced around the outer perimeter of the ring 66. The radial bayonet tabs 78 lock behind the disk post tabs 62 to prevent relative axial movement between the aft arm 48 and disk 16. The retaining ring 66 is captured in groove 60 and passageway 76 by the turbine blade 80 when the blade is installed in the dovetail slot 28.

Figure 4:
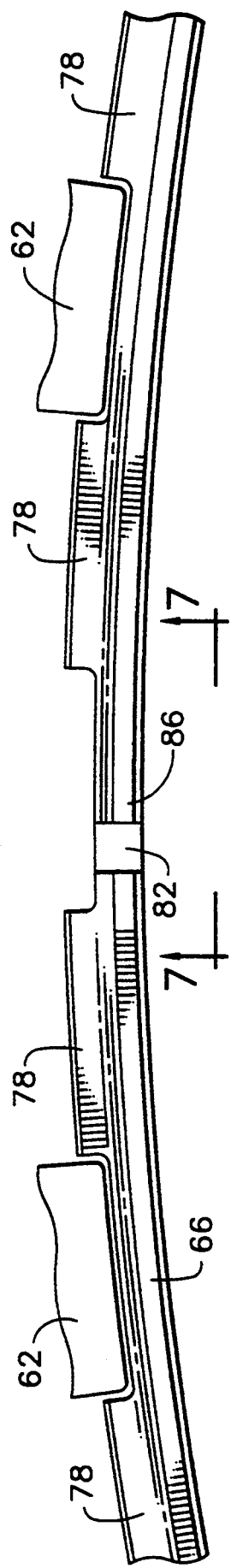
FIG. 4 is an aft elevational view of the axial retention ring taken along line 4—4 of FIG. 2 illustrating an initial assembly step.
Figure 5:
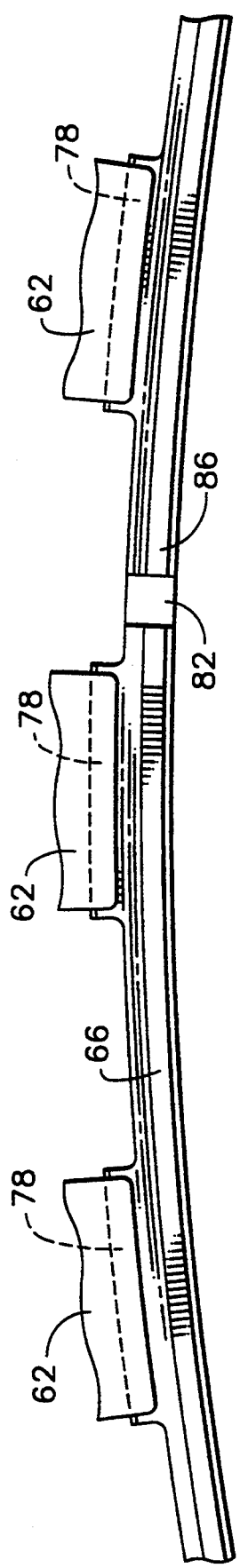
FIG. 5 is a view similar to FIG. 4 illustrating a second assembly step.
Figure 6:
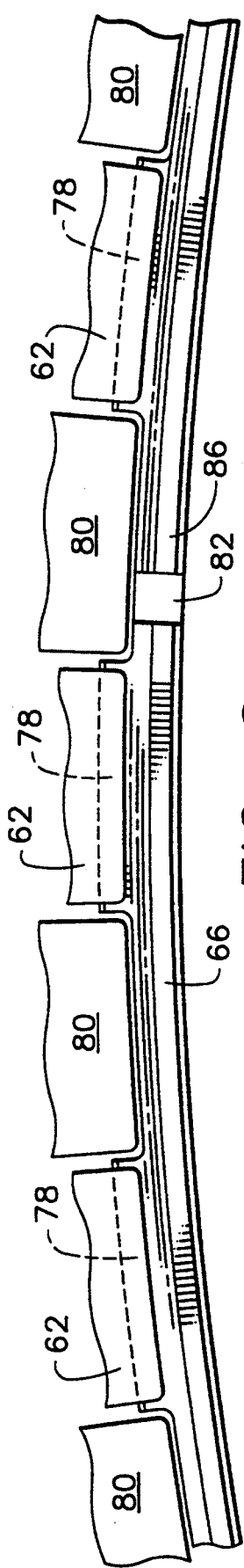
FIG. 6 is a view similar to FIG. 4 illustrating a third assembly step.
Figure 7:
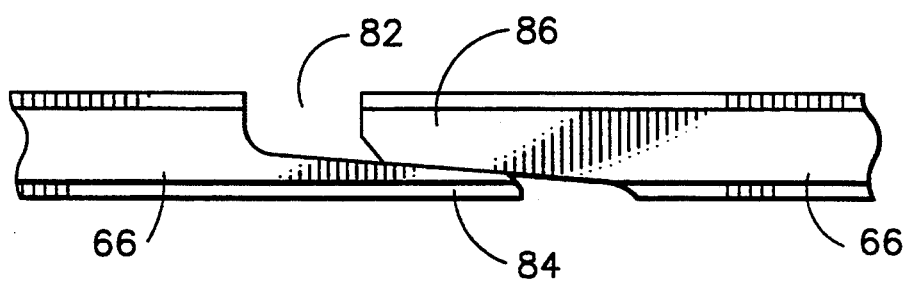
FIG. 7 is an inside-looking-out planar view of a portion of the axial retention ring taken along line 7—7 of FIG. 4 illustrating the two overlapping ends and the split of such ring.

The installation of the retaining ring 66 is shown in FIGS. 4-6. The ring 66 includes a split 82 which allows the ring 66 to be assembled into groove 60 on aft arm rim 58. The ring 66 is then rotated circumferentially so that bayonet tabs 78 are oriented to allow tabs 62 on disk post 64 to pass through the ring 66 axially, as shown in FIG. 4. Following engagement of the aft arm rim 58 and the disk post the ring 66 is rotated so that bayonet tabs 72 are lined up behind tabs 62 in a locking fashion. The aft arm and the second stage disk are now restrained axially to one another, as shown in FIG. 5.

As shown in FIG. 6, the turbine blades 80 are then installed in the dovetail slots of the disk post between tabs 62 to restrict the radial motion of the ring 66 during operation of the engine. Bayonet tabs 78 are located between blades 80 which prevent circumferential rotation of the ring with respect to the second stage disk. During operation, the ring 66 is moved radially outward under centrifugal load and is retained radially by the lower surface 84 of the turbine blade 80, thereby preventing the ring 66 from loading into the second stage disk. The split 82 is an overlap design, as shown in FIGS. 4-7, to ensure that the ends 84 and 86 of the ring 66 are always supported by the blades 80 as the ring 66 expands and contracts during engine operation.

Because the axial retaining ring 66 includes tabs, the overall weight of the retaining ring is reduced. In addition, the depth of the slot 66 and the passage 76 can be substantially reduced due to the locking arrangement of bayonet tabs 78 and disk post tabs 62. This design reduces the stress concentration at the connection which increases useful life of the interstage seal and the second stage turbine disk.

While the form of apparatus herein described constitutes a preferred embodiment of this invention, it is to be understood that the invention is not limited to this precise form of apparatus, and that changes may be made therein without departing from the scope of the invention. For example, this design can be used in any application in the turbine engine where axial retention of mating hardware is required and where previous standard split rings have been employed.

What is claimed is:

1. In a turbine engine of a type having a turbine section including first and second stage disks, an interstage seal located between said disks, said seal including a web portion having an aft arm extending from said web and having a peripheral rim adjacent said second stage disk, an interstage seal aft arm axial retention system comprising:

a peripheral groove located in said peripheral rim;

a plurality of tabs located on said second stage disk extending radially inwardly adjacent said peripheral rim;

means located in said groove for forming a bayonet connection with said second stage disk tabs, wherein said bayonet connection means includes a split retaining ring having two ends and a plurality of radially outwardly extending tabs; and means for preventing circumferential rotation of said axial retention system, wherein said circumferential prevention means is a turbine blade.

2. In a turbine engine of a type having a turbine section including first and second stage disks, an interstage seal located between said disks, said seal including a web portion having an aft arm extending from said web and having a peripheral rim adjacent said second stage disk, an interstage seal aft arm axial retention system comprising:

a peripheral groove located in said peripheral rim;

a plurality of tabs located on said second stage disk extending radially inwardly adjacent said peripheral rim; and means located in said groove for forming a bayonet connection with said second stage disk tabs;

wherein said bayonet connection means includes a split retaining ring having two ends and a plurality of radially outwardly extending tabs;

wherein said two ends overlap.

3. An apparatus for axially retaining an aft arm of an interstage seal with respect to a second stage turbine disk in a jet turbine engine, said aft arm having a peripheral rim adjacent said second stage disk, said second stage disk having a plurality of radially inwardly extending tabs adjacent said peripheral rim, wherein said apparatus comprises a split retaining ring having two ends and a plurality of radially-outwardly extending tabs for engaging said second stage disk tabs in a bayonet locking connection;

wherein said two ends overlap.

4. The apparatus of claim 3 wherein said split retaining ring is located in a peripheral groove formed in said peripheral rim.

* * * * *